(12) United States Patent
Pitman et al.

(10) Patent No.: US 6,306,471 B1
(45) Date of Patent: Oct. 23, 2001

(54) ARBORESCENT CONCEALMENT ARTIFICE

(75) Inventors: David B. Pitman, Lomax, IL (US); Patrick M. Leavy, Farmington Hills, MI (US)

(73) Assignee: Port Midwest International, Inc., Burlington, IA (US)

( * ) Notice: Subject to any disclaimer, the term of this patent is extended or adjusted under 35 U.S.C. 154(b) by 0 days.

(21) Appl. No.: 09/405,356

(22) Filed: Sep. 24, 1999

(51) Int. Cl.[7] .................................................. A01M 31/00
(52) U.S. Cl. ............................ 428/18; 428/23; 428/919; 135/901; 43/1
(58) Field of Search ............................ 43/1; 428/17, 18, 428/20, 23, 27, 919; 135/90, 901; D11/118

(56) References Cited

U.S. PATENT DOCUMENTS

| | | | |
|---|---|---|---|
| 2,744,348 | * 5/1956 | Smith . | |
| 3,164,344 | * 1/1965 | Whyte . | |
| 3,639,196 | * 2/1972 | Hermanson . | |
| 3,829,349 | * 8/1974 | Hermanson . | |
| 3,928,689 | * 12/1975 | Mottel | 428/9 |
| 4,054,696 | * 10/1977 | Crownover | 428/9 |
| 4,496,615 | * 1/1985 | Huang | 428/9 |
| 4,813,441 | 3/1989 | Kepley . | |
| 5,342,661 | * 8/1994 | Wilcox | 428/18 |
| 6,037,021 | * 3/2000 | Koo | 428/10 |
| 6,099,920 | * 8/2000 | Kao | 428/18 |
| 6,116,563 | * 9/2000 | Tsai . | |

* cited by examiner

*Primary Examiner*—Robert Canfield
(74) *Attorney, Agent, or Firm*—Joseph W. Holloway

(57) ABSTRACT

An arborescent concealment artifice for hunters and nature observers constructed of artificial limbs, branches, stems and leaves. The limbs have a plastically deformable wire core sheathed in flexible plastic. The proximal ends of the limbs are detachably connected to a common mounting block; the block is detachably secured to a connector plate disposed intermediate the block and a support; and, the connector plate is detachably secured to the support.

18 Claims, 3 Drawing Sheets

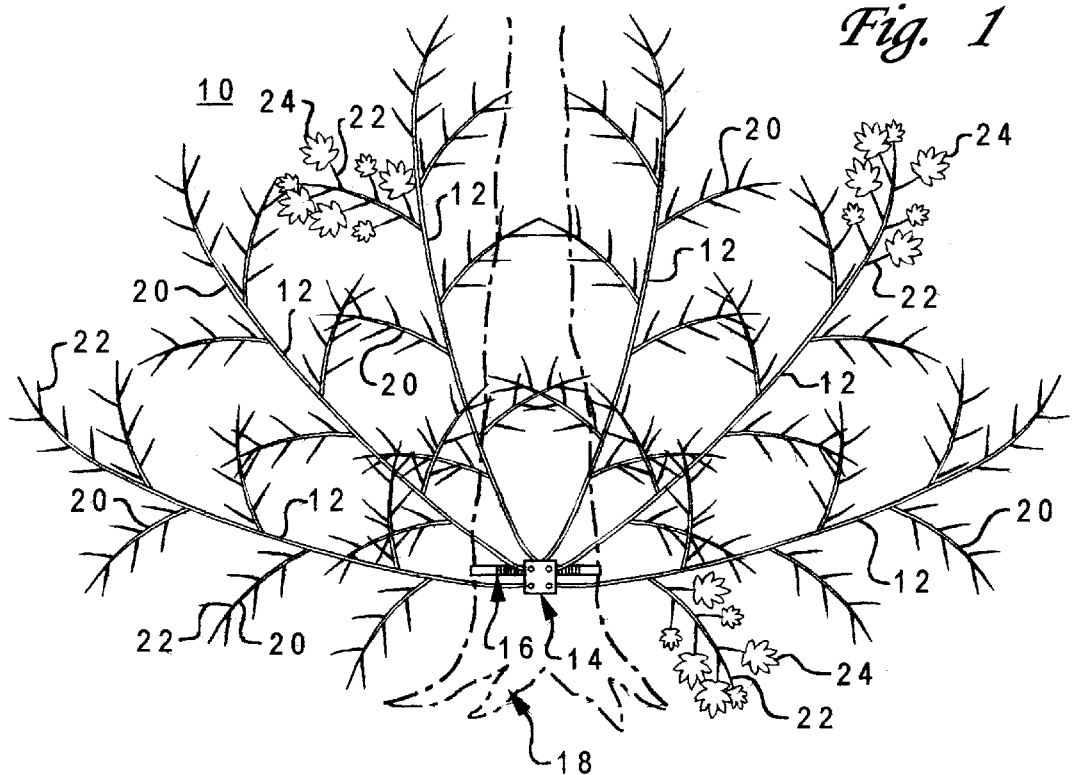
Fig. 1
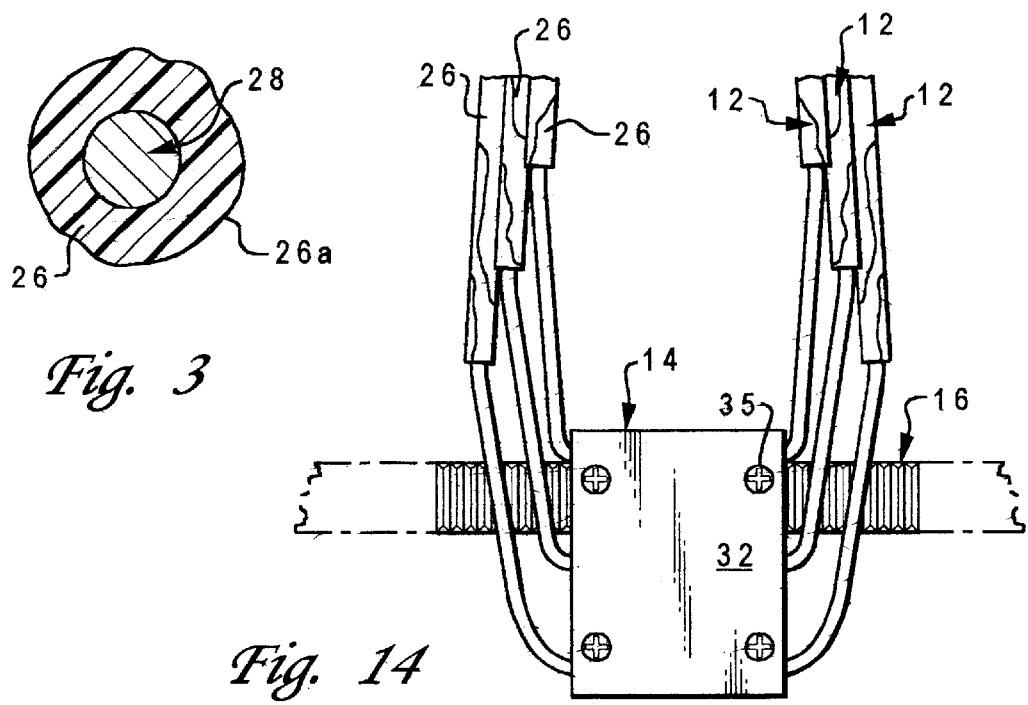
Fig. 3
Fig. 14

ARBORESCENT CONCEALMENT ARTIFICE

TECHNICAL FIELD

The present invention broadly pertains to arborescent artifices used to conceal or mask the presence of humans.

Such devices are employed by sportsmen, photographers and other nature observers to avoid detection by wild life.

BACKGROUND OF THE INVENTION

The art of human concealment has been practiced by game hunters since primeval times. It is likely that primitive hunters commonly employed native foliage, such as trees, shrubs, and brush, to create a screen which reduced the chance of their visual detection while lying in wait for easily alarmed quarry. Where the immediately available supply of foliage failed to produce necessary visual obscuration of the hunter, leafy branches and sprays could be gathered then transported to a promising hunting site for fashioning a crude, but effective blind from fresh foliage. This sort of hunting blind could have been fashioned to mimic so nearly the natural and undisturbed foliage found in and around the selected hunting site that, prior to the onslaught of the hunter, the blind itself, as well as the hunter, went unnoticed by approaching and passing game.

In modern times, much of the forest has been cleared for cities, farms and ranches or has been diverted to timber harvesting; and, the remainder that is suitable as habitat for wild game is either privately owned or its public use is managed by state or federal governmental agencies. Increasingly, private owners and governmental custodians of forests and brush lands prohibit cutting of live foliage by those permitted to enter such areas. Such prohibitions and regulations are intended to maintain the arboreal integrity and beauty of the forest; to preserve sufficient cover to protect and maintain a desired wildlife population; to prevent accumulations of dried out brush on the ground thereby reducing attendant fire hazards; and, to avoid degradation of wooded land used for grazing, timber production, and recreational purposes. Consequently, leafy brush freshly cut from live trees, shrubs or other native growth is seldom employed by hunters, photographers, naturalists, animal wardens or the like as a material for constructing natural-appearing artifices to mask their presence from prey or creatures they wish to photograph or otherwise observe in the wild.

Often times, lacking suitable natural cover yet prohibited from using severed foliage to erect a foliaged screen or blind, today's counterpart of the primitive hunters mentioned above have resorted to the placement of flexible sheets or panels of various camouflage materials over suitable supports to fashion enclosures which totally or partially surround and hide the user. Many patents have been previously issued for various enclosures of this kind, including: U.S. Pat. No. 5,010,909 to Cleveland, U.S. Pat. No. 5,613,512 to Bean, and U.S. Pat. No. 5,842,495 to Egnew et al.

Cleveland shows a rigid box-like enclosure comprising a rigid frame made of PVC tubing and having standing sides covered with flexible fabric.

The patented Bean blind is attached to a conventional tree stand and surrounds the stand structure and its occupant. Glass fiber rods are releasable secured to the seat frame along its sides and front and project upwardly to support upright camouflage panels.

The Egnew et al enclosure comprises-a collapsible skeletal frame made of a plurality of flexible, bow-shaped members having attached thereto a fabric covering. When erected, this tent-like structure has closed sides and a top which serve as a blind and shelter for one or more occupants.

Other prior art blinds of the enclosure type have rigid frames supporting flexible curtain walls The frame may be removably attached about a tree trunk with the frame and curtain looping about a hunter who is either seated in a stand or positioned on the ground at the base of the trunk.

A myriad of other blinds having rigid infrastructures which support one or more fabric panels to form an enclosure are widely available at sporting goods stores. This type of blind is also erected in the field by placing a panel of camouflage fabric over a frame fashioned of crude props such as a bush, a small tree or a fence.

Another category of commonly used concealment devices distinct from the human enclosures noted above is the frontal panel class exemplified by U.S. Pat. No. 4,332,266 to Wageley; U.S. Pat. No. 4,836,231 to Peterson; U.S. Pat. No. 4,838,525 to Snow et al; and, U.S. Pat. No. 5,214,872 to Buyalos.

The Snow et al patent depicts a basic upright, open sided protective shield made up of a plurality of flat corrugated panels hinged together to permit folding to a collapsed transport condition. When erected, ground penetrating support spikes maintain the shield in an upright orientation.

Wageley discloses a collapsible blind comprising an array of radially extending rods joined by an overlying semi-circular panel of camouflage netting or the like. A central upright rod is embedded in the ground and furnishes support for the remaining rods which fan out from the central rod to create a generally semi-circular, planar shield or barrier which is situated in front of a seated or crouching person.

Peterson shows a fan shaped planar structure similar to the Wageley folding blind; however, the rigid ribs of the Peterson device pivot about a common point for either collapsing or tensioning a sheet of flexible material attached to the ribs.

The Buyalos blind is essentially an adjustable umbrella device providing a standing curved plane behind which the user is screened from view.

Smaller planar shields are commonly attached to the limbs of hunting bows to conceal the bow and, to some extent, the archer as well. U.S. Pat. No. 4,817,579 to Mathias; U.S. Pat. No. 4,876,817 to Hill; and, U.S. Pat. No. 5,235,772 to Mendick disclose generally flat panels supported frontally of the bow on a suitable bracket. All of these panels comprise a rigid frame structure overlain by various flexible camouflage materials.

To enhance the stealthiness of both the enclosure type blinds and the upright frontal shields, their structural frames are sometimes covered with flexible panels to which are attached three dimensional artificial leaves thereby more or less emulating the appearance of natural foliage. Such leafy material is also commonly used to make camouflaged outerwear for users of the blinds just discussed.

U.S. Pat. No. 4,813,441 to Kepley depicts a blind attachment for camouflaging a hunter's tree seat wherein the attachment holds severed natural brush in an upright position along the front and sides of the seat structure. Due to the fact that foliage, once severed, will shortly lose its vital appearance and its leaves will begin to shrivel and discolor, such deteriorated foliage will become discernible against a background of living foliage. Moreover, significant leaf shrivelling and loss will eventually expose the hunter and his equipment unless the brush is refurbished periodically or is replaced entirely if successive uses of the seat are spaced by more than a short time. Depending on their freshness and diameter, branches of natural brush tend to be either springy or brittle and, therefore, limit a user's ability to bend such branches to alter the natural shape or opacity of such foliage. Kepley suggests that the user alter the quantity or type of cut brush to achieve such results. Of course, cutting foliage in sufficient quantities to be effective would alter the natural environment surrounding the hunting site; and, for that reason, would be insensitive to preservation ethics and might violate local restrictions and laws.

Blinds constructed in accordance with the teachings of the aforenoted patents and others presently available have some or all of the following structural and operational shortcomings:

1. In spite of the best efforts to camouflage fabric-over-frame blinds to achieve a totally natural appearance, none successfully approximates the appearance of the trunks, branches and leaves of a tree or shrub in its natural state. Because modern camouflaged blinds typically include a rigid skeletal framework overlain by highly opaque material, the marginal delineations of such blinds are easily detectable against any naturally arboreous background even in dim lighting. Moreover, to approaching animals, the light reflectiveness of the blind material contrasts with the light diffusive nature of the natural background and betrays to animals the presence of a foreign object having the unfamiliar size and outline of the blind. Thus blinds of the enclosure and frontal shield types effectively hide the user; however, the blind per se usually remains easily detectable by most wild game thereby defeating the basic purpose of such blinds.

In an effort to disguise the blind structure itself, modifications of conventional camouflage fabrics to produce a sort of floppiness are suggested by Hill U.S. Pat. No. 4,876,817 and by Egnew U.S. Pat. No. 5,842,495; and, leafy blind material is commercially available. However, the most realistic of foliaged fabrics betray, unavoidably, the general outline of an overlain skeletal structure. Furthermore, the shape, size and coloration of the simulant foliage may not harmonize with those of the background foliage at the chosen hunting site. Frequent adjustments of such foliage characteristics to accommodate seasonal changes or different foliage backdrops would require either the installation of different leafy panels on a given blind structure or, alternatively, substitution of an entirely different blind having suitable leaf characteristics. Users of known blinds would find such alternative solutions to be expensive, troublesome and generally impractical.

Since known types of conventionally fabricated blinds present to an approaching animal a visible and unnatural appearing perimetrical edge, exposure of a human or a weapon beyond such fixed edge is almost certain to alert an animal immediately. Artificial foliation placed proximate the blind's edges will not prevent detection of a substantial projection therebeyond such as the hunter's head or a gun barrel or bow. Even if the hunter's hat and face were camouflaged and his weapon were covered with leafy material, as is commonly practiced, such projections beyond the blind would likely present highly discernible moving silhouettes.

2. To avoid the need to peer around the top or side of a blind from time to time in a manner that would likely alert nearby wildlife, a common practice is to provide blind walls with viewing windows and gun ports through which weapons are aimed and discharged. Such windows and ports not only present discontinuities in the visual blending and blurring afforded by conventional camouflage material covering the apertured blind wall, but also draw attention to their marginal edges as do the boundaries of the blind itself. Unless a sizeable number of openings are cut in the blind's walls, user visibility therethrough and available shooting lanes are limited.

3. The weight and bulk of blind enclosures and shields accommodating even a lone hunter can be substantial due to the need for some sort of rigid metal or wooden frame upon which to mount the blind's camouflage covering. Moreover, necessary supporting poles and elongated braces are not easily transportable through wooded and brushy areas. Even where collapsible or knock-down blinds are used, their transport presents an arduous task when the hunting site is remote and inaccessible to vehicles whereby the blind must be packed in by the hunter with his other equipment.

4. Due to their weight or bulk, many blind structures are partially disassembled for easier transport and are reassembled upon arrival at the hunting site. Other prior art blinds are made collapse in order to facilitate their transport and are subsequently returned to their erected condition for hunting purposes. However, when a disassembled blind is reassembled or a collapsed blind is erected at the hunting site, two possible problems may be confronted: firstly, even a short delay at the hunting site occasioned by setting up a blind structure can cause an unfortunate loss of time during the most favorable period of the day; and, secondly, unavoidable noise and air-borne dispersion of human scent incident to the assembly or erection of the blind can alert the quarry to the hunter's presence.

5. In windy or breezy conditions, many known types of blinds having wind-impervious side panels, curtains or other planar surfaces have a tendency to kite whereby transporting and erecting such blind components is made more difficult and tiring. Flexible blind components which flap or are otherwise vibrated by wind produce audible sounds unfamiliar to wild game; and, a fluctuating blind wall may interfere with the sighting and shooting of weapons through or around the wall. In high winds, a windblown panel may be damaged or displaced to such an extent that the presence of the hunter is revealed.

From the preceding recitation of specific problems and long standing shortcomings encountered by users of prior art human concealment devices, it will be appreciated that an improved blind construction intended to supersede presently available blinds should have at least these objectives, characteristics and advantages:

1. A quintessential characteristic of any blind is that it should not have to be hidden or disguised, i.e. the blind should not draw the attention of wild life due to its inherent opacity, sharp marginal demarcation or silhouette.
2. The visible parts of the blind should be fabricated entirely of simulated, life size foliage the character of which can be selected within a broad range of shapes and colors that can be easily varied at a later time if and when changed backgrounds dictate.
3. The foliar blind components should be sufficiently spaced and open, as opposed to conventional tight-knit fabric or solid plastic panels, to afford the user substantially unrestricted vision in all directions. The degree of the foliage's openness, its shape, and its circumpositioning about the user should be readily and infinitely adjustable. Additionally, the structural elements of the blind should be manually bendable to take a set.
4. A surprising aspect of this invention is that the simulated foliar structure of the blind can be readily positioned and thereafter maintained in surrounding relation to the user simply by his plastically deforming the structure.

5. Since most blind erection sites are off road, it is highly desirable that the blind structure be sufficiently light in weight and compact to be quickly moved in its assembled condition thereby avoiding the usual loss of time, production of noise and scent dispersal occasioned by reassembly of the blind at or near the hunting site.
6. The foliar components of the blind should collapse or compress together with expenditure of little time and effort to a compact configuration which is readily transportable through brushy and woody terrain. Upon reaching the hunting site, the blind should be capable of rapid restoration to its fully arrayed condition solely by the user's bending selected limbs, branches, and stems and leaves to shield or surround himself as desired.
7. Plural foliar components of a given arborescent structure should have like ends of their main limbs anchored in a common mounting means which arrays the limbs in a fan-like manner and permits selective positioning of the limbs with respect to one another.
8. The blind should include a simple and effective mounting device for detachably connecting the foliar structure to a wide range of supports such as the trunk of a tree or bush, a post or stake set in the ground, a tree stand, a bow, a land or water vehicle or a human body.

SUMMARY OF THE INVENTION

The general object of this invention is to provide a human concealment in the form of an simulated arborescent blind which overcomes the aforementioned shortcomings of known fabric-on-frame blinds and which embodies all the desirable blind characteristics listed above.

The key object of this invention, i.e. the provision of a blind which does not draw the attention of wild life, is largely achieved by the substitution of a life size simulated arborescent structure in place of conventional fabric panels overlying a rigid infrastructure.

Another object is to provide a highly realistic foliar blind which does not present a sharply delineated outline and which, when windblown or otherwise shaken, displays unlimited and constantly occurring variations in its outline, opacity and light reflectiveness.

Yet another object is achieved by providing artificial foliage for a blind structure that can be readily interchanged thereby permitting seasonal changes in the initially selected color, shape, size and density of the foliage as required to assure that the simulated foliage blends with that which occurs naturally at the hunting site.

A more detailed object is the provision of a blind which, in lateral aspect, closely resembles a life-size low tree or bush having a plurality of upwardly diverging limbs that appear to emanate near ground level from a common base. In the hereinafter disclosed embodiment of the invention, such natural appearance is achieved in an upstanding bundle of limb members bracketed or otherwise gathered and held together at their lower ends, and then fanned outwardly from the center of the bundle. The branches and leaf stems supported by the trunks may also be individually bent to complete the illusion of a natural tree or bush having a desired size, array, density and coloration. Because the orientation of the limbs, branches and leaves can be varied by a simple manual bending operation, the vision blocking and blurring capabilities of the foliage can be changed in a rapid and easy manner.

Another specific object is to provide a somewhat opaque foliar array that produces effective obscuration of a user yet is sufficiently open to permit a wide range of vision and to allow a weapon to be extended and discharged through innumerable shooting lanes defined by the foliage. By shaping easily bendable branches, branchlets and leaves, an observation or shooting port of a desirable size and shape can be fashioned as needed and later closed if desired. The density of the simulant foliage, hence its opacity, need not be uniform but can be increased or decreased by bending and layering or overlapping the branches and leaves in selected areas of the overall array. A related object is realized due to the inherent openness of the foliar blind structure; namely, the wind resistance of the life-size leaves will cause them to move realistically and will produce familiar audible rustling sounds. An unexpected benefit is that the user's contact with any element of the arborescent structure is not likely to alert a wild animal to a human presence but will, instead, enhance the motion and rustling of the leaves. Under more windy conditions, the individual components of the foliar array have sufficient strength and flexibility to resist fracturing or bending and to provide the user with a measure of weather protection.

A still more detailed object is realized by securing the lower ends of a plurality of diverging trunks or limbs in a single base comprising a mounting block. A plurality of grooves opening to various surfaces of the block receive proximal ends of the limbs.

Important operational features of the invention are achieved by the novel interaction of its three principal elements, namely; the base or block to which the foliar structure is detachably connected, a discrete connector that is quickly and effortlessly attachable and detachable from the base block; and, a strap, bracket or other suitable securer for holding the connector to a selected support. One purpose of the discrete connector is the provision of a quick connect and disconnect means enabling a foliage structure previously assembled with a block to be quickly erected at a preselected site where a support has already been equipped with a connector. Such a quick connect and disconnect feature also makes it possible to treat the blind as separate subassemblies comprising firstly, the block and its attached foliage structure and secondly, the connector and its means for attachment to the blind's support. Such subassemblies facilitate the rapid and convenient field replacement of one set of branches with another without first removing the original from its base or block.

Previously indicated advantageous characteristics of simulated foliage employed in carrying out this invention are achieved largely by joining a main limb to its diverging branches, branchlets and leaf stems by means of a continuous, life-like sheath of flexible polyvinyl chloride molded about a skeletal core of branched wire segments. The diameter and length of a particular wire segment depends on which woody part of the foliage will contain that wire segment. For example, the longer stiffer limbs have encapsulated therein the longest and heaviest wire segments while the wire forming the flexible leaf stems is relatively short and light weight. All of the skeletal wire segments comprise a malleable mild steel which, when covered with the aforesaid flexible sheath, affords the woody parts of the foliage structure a semirigid nature and a degree of life-like flexibility. It is important that the skeletal wire core be plastically deformable, i.e. bendable at the location desired and to the degree desired by no more than moderate manual force. It should be understood that the wire cores molded in all parts of the foliar structure must provide sufficient strength to prevent these parts from slumping under their own weight or from bending or breaking in windy conditions. The core can be restored to its original condition, by reversibly bending it. At the lower or proximate end of each branch, the wire core may extend beyond the PVC sheath for ready attachment to the mounting block mentioned above. The size, shape and coloration of the leaves are widely variable and many arboreal species can be closely replicated. More than one leaf stem can be attached to a single branchlet to form a spray of leafy foliage if desired.

These and other features and objects of this invention and the manner of obtaining them will become apparent and the invention will be more fully understood by having reference to the following detailed description of one embodiment of the invention taken in conjunction with the accompanying drawings.

DESCRIPTION OF THE DRAWINGS

FIG. 1 is a frontal view of a simulated arborescent structure supported by a tree shown in phantom lines;

FIG. 3 is a section taken along line 3—3 of FIG. 2;

FIG. 14 is a fragmentary view similar to FIG. 2 showing the structure in a folded condition; and, depicting a fragment of an elongated flexible member.

DETAILED DESCRIPTION OF THE INVENTION

Figure 2:
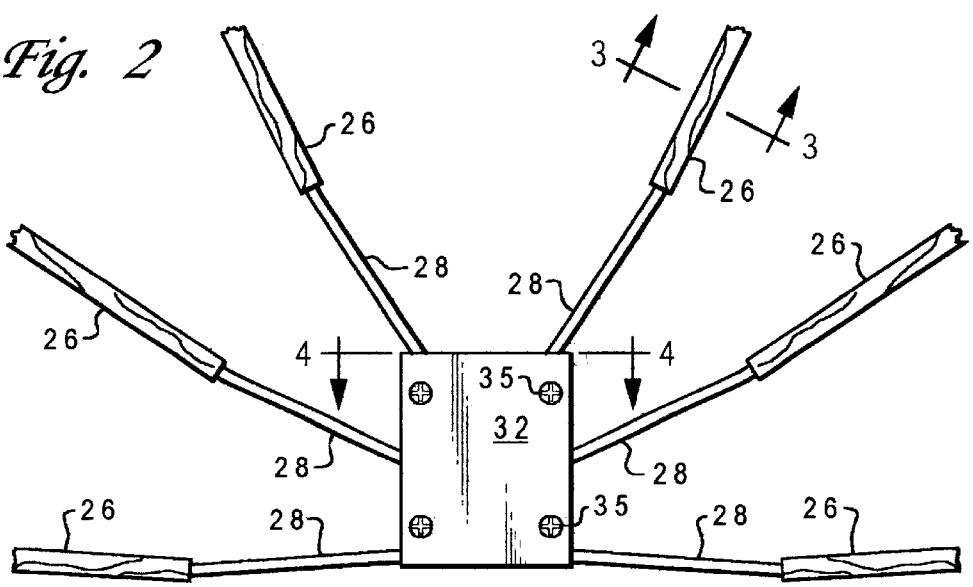
FIG. 2 is an enlarged fragmentary view of the structure shown in FIG. 1.

FIG. 1 depicts an illustrative embodiment of a concealment artifice constructed in accordance with the teaching of this invention. In its entirety, the artifice comprises a arborescent structure 10 made up of one or more artificially foliaged major limbs 12, a mounting means 14 for receiving the limb or limbs 12; and, a flexible securing means 16 encircling a support 18 such as, for example, the tree trunk shown in phantom lines. A substantial member of branches 20 project from each limb 12; and, a plurality of leaf stems 22 with attached leaves 24 project from each branch. In FIG. 1, only a limited number of leaves 24 is depicted in order to disclose more clearly the nature of the foliar framework of the entire structure 10. The illustrative framework includes six more or less identical limbs 12 anchored in a common mounting means 14. The limbs diverge generally outwardly and upwardly from the mounting means in a fan-like manner placing certain of the branches and leaves in touching or overlapping relation with one another. The leaves 24 should be available in several shapes, sizes and colorations to provide natural looking arborescent artifices which closely imitate the seasonal foliage of a wide variety of trees, shrubs, reeds, grasses, etc. The leaves are die cut from thin sheets of flexible but tough, photographically imprinted plastic material such as polyester.

The woody parts of structure 10 are fabricated by first connecting lengths of wire to form a branched skeletal frame, not shown, and then molding a continuous plastic sheath 26 of flexible polyvinyl chloride over and about the wire frame. The cut leaves may also be a attached to a portion of the sheath overlying the distal ends of the leaf stems 22 as an incident to molding the sheath 26. This general method of making artificial foliage does not comprise a part of this invention; however, the specific structural arrangement, sizes and shapes, and choice of materials disclosed herein is not believed to have been commonly used or known prior to this invention. The diameters and lengths of the wire segments encapsulated inside the sheath vary considerably. The longer, stiffer limbs 12 may contain wire cores 28 of up to six feet or more in length and three sixteenths of an inch in diameter while the wire diameters of the shorter, more plyable branches 20 and stems 22 are much less. The wall thickness of the sheath 26 molded about the wire of skeletal core also varies so that all of the simulated woody parts of the foliaged structure 10 display life-like flexibility. FIGS. 2 and 3 indicate the relative diameters of a limb core 28 and its associated sheath 26. As an incident to molding the sheath 26, its outer surface 26a may be embossed to create the appearance of the periderm of a woody plant; and, the plastic material selected for the sheath should have a life-like coloration. For the several reasons set forth above, it is desirable that the limbs, branches and stems be plastically deformable when bent or crimped by no more than moderate manual force. This end is achieved by making the branched skeletal core of this invention of a suitably malleable, mild steel wire. However, the material and dimensions of the relatively soft core wire must still provide all parts of the skeletal frame with sufficient strength to prevent slumping or bending under their own weight or under stress created by windy conditions. Furthermore, it is desirable that the wire core as well as the sheath display substantial resilience unless and until the wire is purposely bent and given a set.

Figure 12:
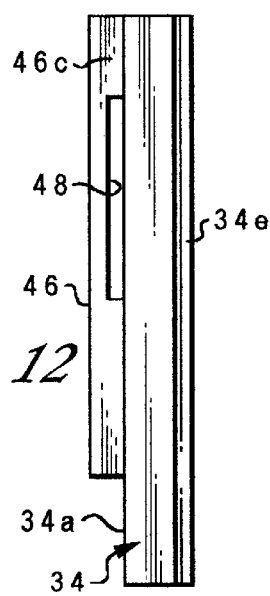
FIG. 12 is a side elevational view of the connector plate shown in FIG. 9.

FIGS. 1 and 2 show limbs 12 projecting at various angles from the opposite sides and the top of mounting means 14. In this deployed condition of structure 10, the exposed ends of the limb cores 28 are substantially longitudinally aligned with the limb sheaths 26, the limbs 12 are bowed inwardly toward the center of the structure 10 and the branches 20 slope angularly from the limbs. All of the just mentioned relative alignments of the parts of the structure 10 can be dramatically altered by the user's grasping and bending any individual part. For example, the limbs 12 may be manually gathered together toward the center of the structure thereby causing the ends 28a of the limb cores to deform and take a shape generally as shown in FIG. 12. When so bent together or bundled, the structure 10 is more readily transported and erected by the user. The entire structure 10 can be further compacted by compressing and binding it with a surrounding tie or by encasing the structure within a suitable carrying sheath.

As shown in FIGS. 4 through 11, the mounting means 14 which receives and supports the proximal ends 28 of the limb cores generally comprises a base or block 30, a cover plate 32 and a discrete connector plate 34.

Figure 5:
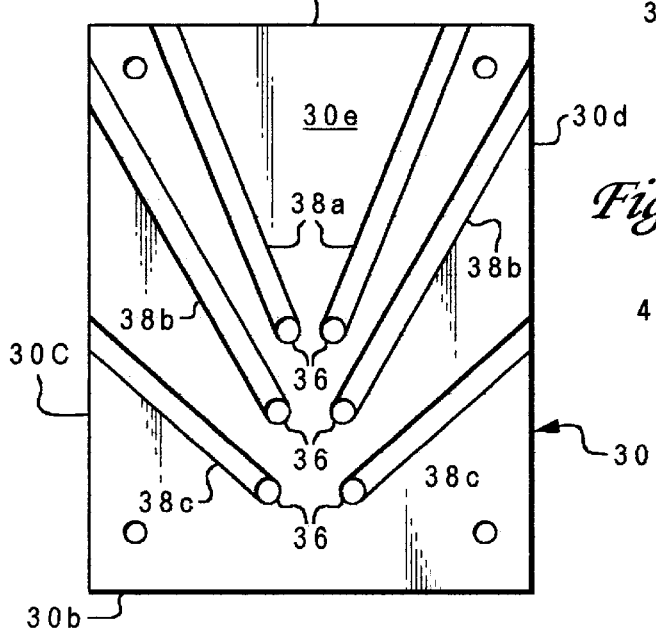
FIG. 5 is a view taken generally along line 5—5 of FIG. 4, showing the front cover plate removed.
Figure 13:
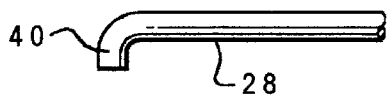
FIG. 13 is an enlarged fragmentary view.

The mounting block is generally orthogonal having top and bottom surfaces 30a, 30b, opposed side surfaces 30c, 30*d* and front and rear surfaces 30*e*, 30*f*. As used herein, the term "front" shall mean facing away from the support 18. For example, FIG. 1 shows the front surface of the base 14. The cover plate 32 is a right parallelepiped dimensioned to register with the edges of the front block surface 30*e*; and, the cover plate is detachably secured to block 30 by means of conventional threaded fasteners 35 having heads recessed in the cover plate 32. The uncovered front block surface 30*e* is shown in FIG. 5 to have shallow cylindrical recesses 36 which open normally to surface 30*e* to either side of its vertical centerline. Elongated cavities in the form of plural pairs of grooves 38*a*, 38*b* and 38*c* are relieved in block surface 30*e* and the inner end of each groove intersects with a recess 36. The grooves open laterally to the surface 30*e* and their longitudinal centerlines, not shown, lie in the same plane. The outer ends of grooves 38*a*, 38*a* open to the block top surface 30*a* while the paired grooves 38*b* and 38*c* open oppositely to block side surfaces 30*c* and 30*d*, respectively. The grooves slope upwardly and outwardly with respect to the vertical centerline of the block face 30*e*; and, the included angle between each pair of grooves varies and become progressively smaller from the bottom pair 38*c* to the top pair 38*a*.

Figure 4:
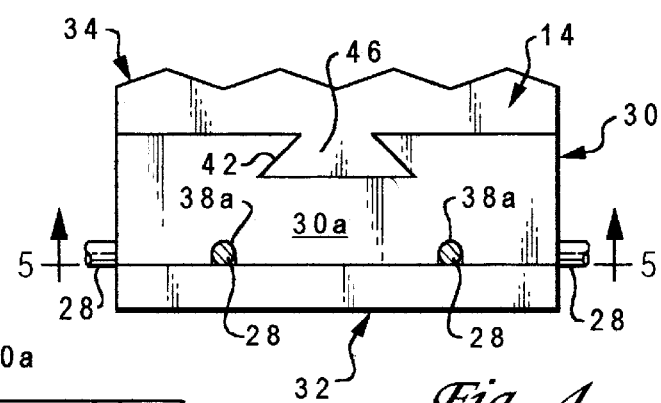
FIG. 4 is an enlarged plan view of an assembled mounting block and connector plate looking generally along line 4—4 of FIG. 2.

The function of the recesses 36 and the grooves 38*a*, 38*b*, 38*c* is to receive and releasably retain the projecting attachment segments 28 of the limbs cores. To this end, the bare wire end 28 of each of the limbs is turned down to terminate in a hook 40 which can be inserted in one of recesses 36 with the adjacent bare wire segment 28 extending longitudinally through an associated groove and exiting that groove to either block surface 30*a*, 30*c* or 30*d*. To detachably join the proximal ends of wires 28 to the mounting block, the cover plate is affixed to the block surface 30*e*, as shown in FIGS. 2 and 4, by means of fasteners 35 whereby the terminal hooks 40 are depressed in the recesses 36 and the extending wires 28 are held in the grooves. Thus, unintended longitudinal withdrawal of the limbs 12 from the grooves is prevented; and, the varied exit angles of the individual limbs from block 30 correspond to the selected angularities of the grooves.

A comparison of FIGS. 2, 5 and 12 demonstrates that the exit angles of limbs 12 from block 30, hence the divergence of the limbs, can be varied, as desired, by changing the slope and location of some or all of the grooves 38*a*, 38*b* and 38*c*. It will also be apparent the maximum number of limbs 12 that can be releasably connected to the mounting means 14 can be reduced or increased by a corresponding change in the number of recesses 36 and grooves 38 formed in surface 30*e* of the block 30. For example, it has been found that a maximum of four relatively short limbs are required for a bow-attached artifice while six larger limbs are usually required for a tree stand blind or for the illustrative ground blind shown in the drawings. Obviously, the number of limbs to be received in the block 30 will be a determinant in the physical size and shape, not only of the block, but also of the cover plate 32 and the connector plate 34 which sandwich the block.

Figure 6:
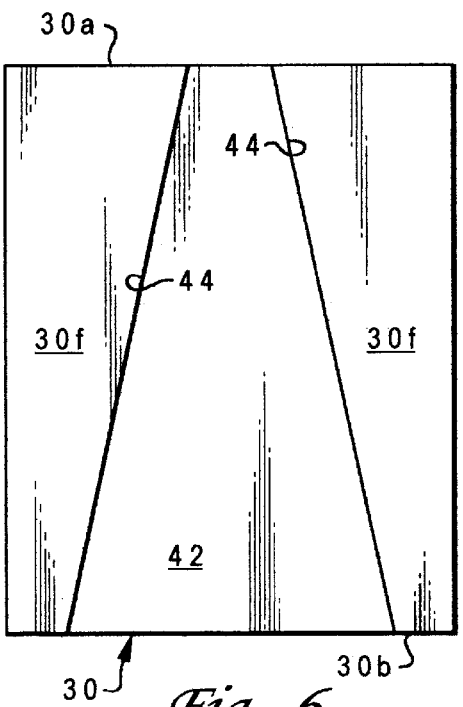
FIG. 6 is a rear elevational view of a mounting block disassembled from a connector plate.
Figure 7:
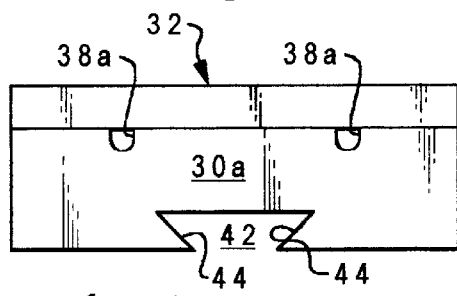
FIG. 7 is a top plan view of the block shown in FIG. 6.
Figure 8:
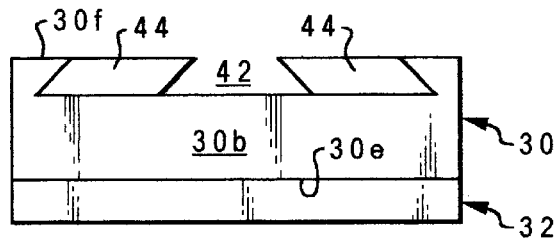
FIG. 8 is a bottom plan view of the block shown in FIG. 6.

The configuration of the rear surface 30*f* of block 30 is best seen in FIGS. 6, 7 and 8 and includes a vertically extending groove or mortise, generally indicated by numeral 42, which is formed medially across surface 30*f* and opens at its opposite ends to block surfaces 30*a* and 30*b*, respectively. The bottom opening of groove 42 is wider than its top opening and the opposed walls 44, of the groove are undercut and taper uniformly from end to end.

Figure 9:
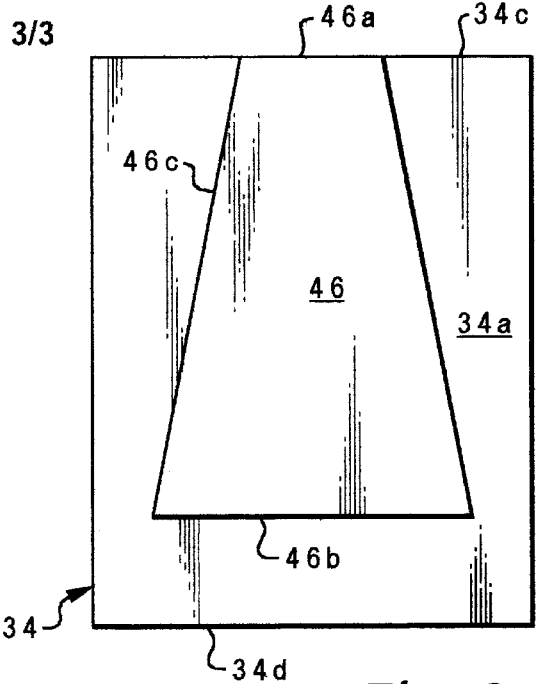
FIG. 9 is a front elevational view of a connector plate disassembled from a mounting block.
Figure 10:
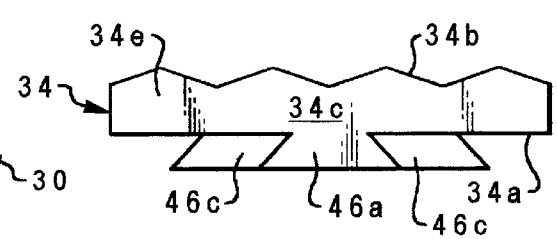
FIG. 10 is a top plan view of the connector plate shown in FIG. 9.
Figure 11:
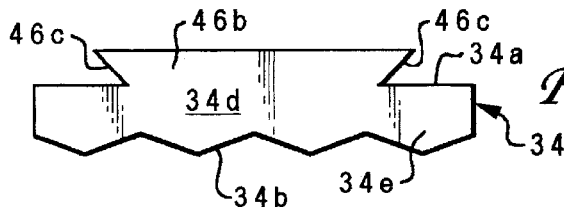
FIG. 11 is a bottom plan view of the connector plate shown in FIG. 9.

The connector plate 34 is illustrated in FIGS. 9, 10 and 11 and includes a front face 34*a* and a rear face 34*b*. Plate face 34*a* includes a vertically extending and forwardly projecting tenon 46 formed medially across the face. The top surface 46*a* of the tenon lies in the plane of the top surface 34*c* of the plate 34; and the bottom surface 46*b* of the tenon is disposed somewhat above the bottom plate surface 34*d*. The opposed side walls 46*c*, 46*c* of the tenon are undercut at the same angle as are the walls 44, 44 of the groove 42; and, the walls 46*c*, 46*c* converge at the same angle as do the walls 44, 44. From the foregoing description of the groove 42 and tenon 46, it will be understood that the block 30 and connector plate 34 have complementary interfitting surfaces which can be detachably joined by these steps: The rear block surface 30*f* is placed in facing juxtaposition with surface 34*a* of the plate so that the bottom opening of groove 42 is generally aligned with the top surface 46*a* of tenon 46. The block is then shifted downwardly until the tenon walls 46*c*, 46*c* are engaged by the groove walls 44, 44. Further downward movement of the block 30 relative to the plate 34 will cause the tenon 46 to wedge in the groove 42 with the top tenon surface 46 in flush relationship with the top block surface 30*a*. The wedging interaction of tenon 46 in groove 42 provides dual advantages for the user of this invention: firstly, the block 42 and any simulated foliage carried thereby can be quickly and effortlessly attached to and detached from the connector plate 34; and, secondly, the weight of the block and foliage alone will maintain this wedged connection without an additional locking or latching device.

The illustrative rear face 34*b* of the connector plate 34 has an uneven surface made up of shallow triangular teeth 34*e*; however, various other projecting irregularities will also serve to enhance the gripping engagement of the plate 34 with a support such as the tree 18.

Not only does the discrete plate 34 provide a releasable connection with block 30; the plate has a slot 48, shown in FIG. 12, for receiving therethrough the flexible member 16 shown in FIGS. 1 and 12 which detachably joins the plate, the base 30 and the limbs 12 to the support 18. The slot 48 extends transversely through the tenon 46 proximate its top end. The size and shape of the slot is selected to receive slidably a flexible flat member 16 such as a band or belt woven of nylon or other strong and weatherproof material. The belt ends, not shown, may carry any type of well-known fastener device for drawing these ends together around the support 18 and thereafter maintaining sufficient tension to the belt to prevent it from slipping vertically or circumferentially.

Preferably, the block 30, the cover plate 32 and the connecting plate 34 are each fabricated of a strong, machinable, and lightweight plastic material. The parts may be machined from solid stock or, alternatively, they may be cast or molded and then finish machined as needed. The tenon portion 46 of plate 34 may be integral with the rest of plate 34 or, alternatively, it can be made as a separate piece and joined to the plate 34 by fasteners or by bonding. If desired these parts of the mounting means 14 can be made of metal, such as aluminum, and thereafter coated with a stealthy paint.

OPERATION OF THE INVENTION

Prior to deployment of the arborescent structure described herein at a selected hunting or observation site, the limbs 12 should be changed, if needed, to provide limbs of a suitable length having leaves 24 which correspond closely to the species and seasonal coloration of live foliage at the selected deployment site. In accordance with this invention, some or all of the limbs 12 may be quickly and simply detached by first removing cover plate 32 from the mounting block 30, then disengaging the hooked wire ends 40 from the recesses 36 and lifting the wires 28 from the open grooves 38a, 38b, 38c. This process is reversed to install substitute limbs. The limbs can be prepared for transport by manually grasping and compressing them inwardly into a compact bundle. When folded, as seen in FIG. 12, the bare wire ends 28 of the limbs 12 will be bent near their exit points from the block 30 whereby the divergence of the limbs 12 is greatly reduced from that shown in FIGS. 1 and 2. At this time, the connecting plate 34 and its belt 16 need not be attached to the block 30; however, these components of the structure 10 ordinarily remain assembled for transport since the weight and bulk of the plate and belt are negligible. If the plate and belt are to be attached to a portable support such as a tree seat or a bow, such an operation may be completed in a more expeditious manner prior to transporting the seat or bow to the selected site.

Unless a structure 10 has been previously deployed at the selected site and its connecting member 34 remains belted to a selected support, the next step at the site is to disassemble the connector 34 and block 30. The flexible member 16 is then secured to a selected support at an elevation suitable for positioning the foliar array for best concealment of the user. Supports suitable for ground hunting include tree trunks, bushes, fence posts and various upright members driven into the ground. Tree stands generally are secured to a sizeable tree trunk or limb or to a rudimentary platform. Attachment of the connector plate 34 to a bow, a boat, a truck or a human would probably require modification of the connector plate 34 and/or the flexible member 16. To complete the deployment of structure 10, the block is then joined with the connector plate by wedging the tapered walls of the groove 42 and the tenon 46 together in the manner described hereinabove. Thus, it will be appreciated that the on site attachment of the connector plate 34 to the support and the subsequent assembly of the block 30 to the connector plate are accomplished expeditiously and with a minimum of noise and dispersal of human scent. Even in windy conditions, the wind resistant limbs can be quickly anchored by simply slipping the block groove 42 down over the protruding tenon 46 of the connector plate 34.

After the limbs 12 are secured to a support, such as tree trunk 18, the plastically deformable limbs 12, branches 20 and leaf stems 22 are bent by the user to accomplish his obscuration in the advantageous and unexpected manner set forth above in the OBJECTS OF THE INVENTION. For example, should the user choose to position himself in front of the structure 10, the limbs 12 can be bent forwardly and then inwardly to enclose the user entirely within the artificial foliage of the surrounding structure 10. Thereafter, the user may bend individual branches 20 and leaf stems 22 to enhance the illusion of a naturally foliaged tree or bush having a desired size, array, opacity and coloration. Obviously, the user could position himself beside the support and shape the limbs to form a frontal screen to obscure his presence. FIG. 1 depicts the structure 10 deployed as a screen rather than as an enclosure. From within or behind the structure 10 the user can shape the easily bendable branches, branchlets and leaf stems to open and close observation or shooting ports of a suitable size, shape and number.

When the user wishes to leave the structure temporarily, he need only push or bend a limb or limbs 12 aside to make his exit. If the user plans to leave the hunting site, he can first disassemble the block 30 from the connector plate 34 before removing the belt 16 from around the support 18; or, if he plans to revisit the site, he may choose to leave the connector plate belted to the support for subsequent reuse. Likewise, the user may install a number of disassembled connector plates 34 on supports located at several likely hunting or observation sites. With such preparation, only a single foliaged block 30 need transported from site to site.

With the limbs 12 gathered, the structure 10 has the general shape of a bow and can be bound or sheathed for carrying over the user's shoulder by means of a suitable sling. Alternatively, the collapsed structure can be secured to a backpack or to another carried structure such as a tree stand.

It should be understood that arborescent structures larger than structure 10 can be provided by increasing the size of the mounting block 30 and adding additional recesses 36 and grooves 38 for attaching additional limbs 12. Larger or more opaque arborescent structures can also be made by mounting more than one structure on the same support or on neighboring supports. It should also be understood that variations of the specific construction, arrangement and use of the disclosed arborescent artifice can be made by those skilled in the relevant art without departing from the scope and spirit of the appended claims.

What we claim as our invention is:

1. A concealment artifice, comprising:
   a simulated arborescent structure having at least one projecting limb;
   mounting means for releasably connecting said limb to a support;
   said mounting means including base means defining first attachment means which receives said limb;
   said mounting means including a discrete connecting member detachably joined to said base means and said support; and,
   said base means and said connecting member having complementary surfaces providing an interfitting joint therebetween.

2. The artifice defined in claim 1, wherein:
   said complementary surface on said base means comprises a groove therein; and,
   said complementary surface on said connecting member comprises a projection therefrom.

3. The artifice defined in claim 1, wherein:
   said complementary surfaces define a mortise and a tenon having reversely sloping side walls.

4. The artifice defined in claim 3, wherein:
   said mortise and tenon are shiftable with respect to one another.

5. The artifice defined in claim 4, wherein:
   said mortise and said tenon narrow toward like ends thereof.

6. The artifice defined in claim 1, wherein:
   said base means and said connecting member are made of light weight, machinable plastic.

7. A concealment artifice, comprising:
   a simulated arborescent structure having a branched skeletal core substantially encased in a sheath;
   said structure having an attachment segment situated proximate one end of said sheath;
   mounting means for detachably joining said attachment segment to a support;
   said mounting means including a base to which said attachment segment is detachably joined and including a connecting member disposed between and detachably joined to said base and to said support; and, said base including a generally orthogonal plastic block having a plurality of cavities formed therein.

8. The artifice defined in claim 7, wherein:

said skeletal core comprises divergent wire elements having varied lengths and diameters.

9. The artifice defined in claim 8, wherein:

said wire elements when stressed are resilient up to their point of plastic deformation.

10. The artifice defined in claim 8, wherein:

said wireelements comprise malleable steel.

11. The artifice defined in claim 7, wherein:

said sheath comprises flexible polyvinyl chloride plastic.

12. The artifice defined in claim 7, wherein:

said mounting means defines a cavity in which said attachment segment is releasably retained.

13. The artifice defined in claim 7, wherein:

said block has a surface with a tapered groove cut medially thereacross and said groove has undercut side walls.

14. A concealment artifice, comprising:

simulated arborescent structure having a branched skeletal core substantially encased in a sheath;

said structure having an attachment segment situated proximate one end of said sheath;

mounting means for detachably joining said attachment segment to a support;

said mounting means including a base to which said attachment segment is detachably joined and including a connecting member disposed between and detachably joined to said base and to said support;

said connecting member including a plate;

said plate has a surface with a projection formed medially thereacross; and, said mounting means including an elongated flexible member for detachably joining said connecting member to said support.

15. The artifice defined in claim 14, wherein:

said projection has an opening through which said flexible member is slidable.

16. The artifice defined in claim 14, wherein:

said plate has another surface which in uneven.

17. A concealment artifice, comprising;

a simulated arborescent structure having projecting limbs;

mounting means for releasably connecting said limbs to a support;

said mounting means including base means defining plural first attachment means which receive said limbs;

said mounting means including a discrete connecting member detachably joined to said base means and said support;

said base means defining second attachment means;

said connecting member having a portion detachably joined with said second attachment means;

the proximal end of said limbs are detachably joined to said first attachment means;

said plural first attachment means include elongated cavities opening laterally to a surface of said base means; and, said cavities are grooves which slope with respect to the centerline of said surface.

18. A concealment artifice, comprising:

a simulated arborescent structure having projecting limbs;

mounting means for releasably connecting said limbs to a support;

said mounting means including base means defining plural first attachment means which receive said limbs;

said mounting means including a discrete connecting member detachably joined to said base means and said support;

said base means defining second attachment means;

said connecting member having a portion detachably joined with said second attachment means;

the proximal end of said limbs are detachably joined to said first attachment means;

said plural first attachment means include elongated cavities opening laterally to a surface of said base means; and, the longitudinal centerlines of said cavities lie in substantially the same plane.

\* \* \* \* \*